(12) United States Patent
Geppert et al.

(10) Patent No.: US 8,917,837 B2
(45) Date of Patent: Dec. 23, 2014

(54) CONSUMER CONTACT PORTAL (75) Inventors: Birgit Andrea Geppert, Basking Ridge, NJ (US); Reinhard Peter Klemm, Basking Ridge, NJ (US); Frank Michael Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1453 days.

(21) Appl. No.: 12/570,906

(22) Filed: Sep. 30, 2009

(65) Prior Publication Data

US 2011/0075824 A1 Mar. 31, 2011

(51) Int. Cl.
H04M 11/00 (2006.01)
G06F 21/62 (2013.01)
G06Q 30/02 (2012.01)

(52) U.S. Cl.
CPC ............ G06F 21/6245 (2013.01); G06Q 30/02 (2013.01)
USPC .......................... 379/93.12; 709/228; 709/232

(58) Field of Classification Search
USPC ................ 709/206, 207, 228, 232; 379/93.12
See application file for complete search history.

(56) References Cited

U.S. PATENT DOCUMENTS

| | | | | |
|---|---|---|---|---|
| 6,807,423 | B1* | 10/2004 | Armstrong et al. | 455/440 |
| 8,069,202 | B1* | 11/2011 | Cona et al. | 709/200 |
| 2003/0033179 | A1* | 2/2003 | Katz et al. | 705/7 |
| 2003/0154293 | A1* | 8/2003 | Zmolek | 709/228 |
| 2004/0034546 | A1* | 2/2004 | Lauper et al. | 705/1 |
| 2006/0149816 | A1 | 7/2006 | Cadiz et al. | |
| 2007/0082680 | A1 | 4/2007 | Fish | |
| 2007/0121808 | A1 | 5/2007 | Brunson et al. | |
| 2007/0141875 | A1 | 6/2007 | Daigle | |
| 2009/0177729 | A1* | 7/2009 | Ben Ezra et al. | 709/202 |
| 2010/0174647 | A1* | 7/2010 | Kowalchyk et al. | 705/44 |
| 2013/0132519 | A1* | 5/2013 | Walsh et al. | 709/217 |

OTHER PUBLICATIONS

Reino, Bernardo, "EP Application No. 10172322.9 European Search Report Jan. 21, 2011" Publisher: EPO, Published in: EP.

* cited by examiner

*Primary Examiner* — Gerald Gauthier
*Assistant Examiner* — Simon King (57) ABSTRACT A method is provided for the sharing of information in which a request for information is transmitted along with an indication of a reason for which the information is sought and, in response to the request, a subset of the information available is provided on the basis of a characteristic of the event.

20 Claims, 6 Drawing Sheets

CONSUMER CONTACT PORTAL

FIELD OF THE INVENTION

The present invention relates to telecommunications in general, and, more particularly, to an improved method for information retrieval.

BACKGROUND OF THE INVENTION

Ordinarily customers entrust their personal information to business enterprises as a condition for obtaining a service. For example, if a customer wants to obtain a cable television service, the customer must provide his address, telephone number, credit card number, and possibly, Social Security number to the cable television company. Once the customer provides this information, he or she has no control over how the information is used and cannot prevent the company from using the information contrary to the will of the customer.

For an instance, the cable television company may use the customer's telephone number to make undesired telemarketing calls to the customer. The company can call the customer at inconvenient times or at a telephone number at which the customer does not want to be called in the absence of an emergency. Therefore, a need exists for an improved method that provides customers with a greater control over how their information is used.

SUMMARY OF THE INVENTION

The present invention answers this need by providing a method for storing sensitive customer information without some of the costs and disadvantages of doing so in the prior art.

In accordance with the present invention, a first party stores his or her personal information on a server running consumer portal software. The consumer portal software is software that allows the first party to specify and store one or more rules that govern the sharing of the information of the first party with third parties by the consumer portal. At a later point, when the consumer portal receives a request by a third party to disclose the first party's information, the portal consults the rules specified by the first party and discloses only the information which it is permitted to disclose by the rules.

For example, in a situation in which a business organization needs to contact the first party with an offer to purchase a service, the business organization issues a request to the consumer portal for the telephone number and email of the first party. Along with the request, the business organization transmits an indication of a reason for which the information is sought which reveals that the information is sought in connection with calling the customer with an offer for a new service.

Upon receipt of the request for information and the indication of a reason for which the requested information is sought, the consumer portal determines whether the customer has specified any rules for the disclosure of the phone number. In this example, the consumer portal determines that the customer has prohibited the disclosure of his or her telephone number in connection with telemarketing calls. Subsequently, the consumer portal processes the indication of a reason for which the information is sought, determines that the information is sought in connection with a telemarketing call, and transmits only the first party's email to the business organization.

The illustrative embodiment of the present invention comprises: (i) receiving at the consume portal a request to transmit information about a first party; (ii) receiving an indication of a reason for which the requested information is sought; and (iii) transmitting from the consumer portal a subset of the available personal information about the first party, wherein the subset is chosen based on the reason for which the requested information is sought.

Although some embodiments of the present invention are described in the context of business-customer relations, it is to be understood that the uses and applications of the methods and principles described in this disclosure extend to virtually any field in which it is desirable to provide entities with greater control over how their information is shared.

DETAILED DESCRIPTION

Figure 1:
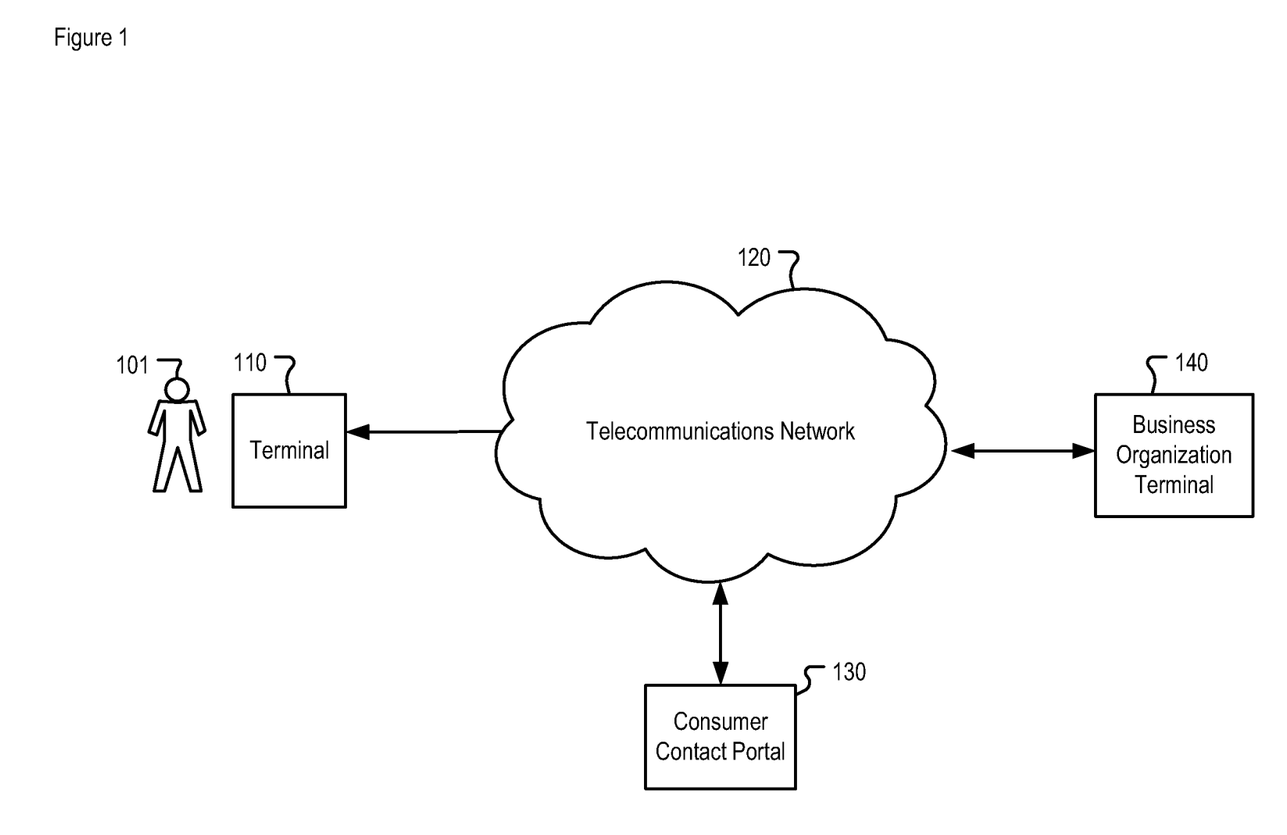
FIG. 1 depicts the salient components of the illustrative embodiment of the present invention.

FIG. 1 depicts the salient components of the illustrative embodiment of the present invention. The illustrative embodiment comprises user 101, terminal 110, telecommunications network 120, consumer portal 130, and terminal 140.

User 101 is a natural person using terminal 110. However, it will be clear to those skilled in the art, after reading this disclosure, how to make and use alternative embodiments of the present invention in which user 101 is another entity, such as, for example, and without limitation, a business organization, a social network, etc.

Terminal 110 is a personal computer. Terminal 110 allows user 101 to connect and interact with consumer portal 130. It will be clear to those skilled in the art, after reading this disclosure, how to make and use alternative embodiments of the present invention in which terminal 110 is any telecommunications device, such as, for example, and without limitation, a cellular telephone, portable digital assistant (PDA), etc.

Telecommunications network 120 transports signals between terminal 110, terminal 140, and consumer portal 130. In accordance with the illustrative embodiment of the present invention, telecommunications network 120 is the Internet, but it will be clear to those skilled in the art, after reading this disclosure, how to make and use alternative embodiments of the present invention in which telecommunications network 120 is another telecommunications network (e.g. the Public Switched Telephone Network, cellular telephone network, etc.).

Consumer portal 130 is computer hardware (e.g. processor, memory, storage, network adapter, etc.) and software for maintaining an information record for user 101 together with one or more rules for sharing the information available on the record. In accordance with the illustrative embodiment of the present invention, consumer portal 130 maintains a record of identification, contact, and payment information for user 101. However, those skilled in the art will recognize, after reading this disclosure, how to make and use alternative embodiments of the present invention in which consumer portal 130 is capable of storing any type of information concerning user 101, such as, for example, and without limitation, familial information, employment information, address history, information concerning the user's education, etc.

Terminal 140 is hardware (e.g. processor, memory, storage, network adapter, etc.) and software for executing transactions on behalf of a business organization. In accordance with the illustrative embodiment of the present invention, terminal 140 is residing within the enterprise network of the business organization, but it will be clear to those skilled in the art, after reading this disclosure, how to make and use alternative embodiments of the present invention in which terminal 140 is residing outside of the enterprise network. In accordance with the illustrative embodiment of the present invention, the transactions, which terminal 140 is capable of executing, include informing user 101 of new services offered by the business organization, informing the user for changes in the user's service plan, billing the user, and others. When terminal 140 is instructed to execute a transaction, it connects to consumer portal 130 and requests information about user 101 that is necessary to complete the transaction. The terminal, then, uses the obtained information to execute the transaction.

Figure 2A:
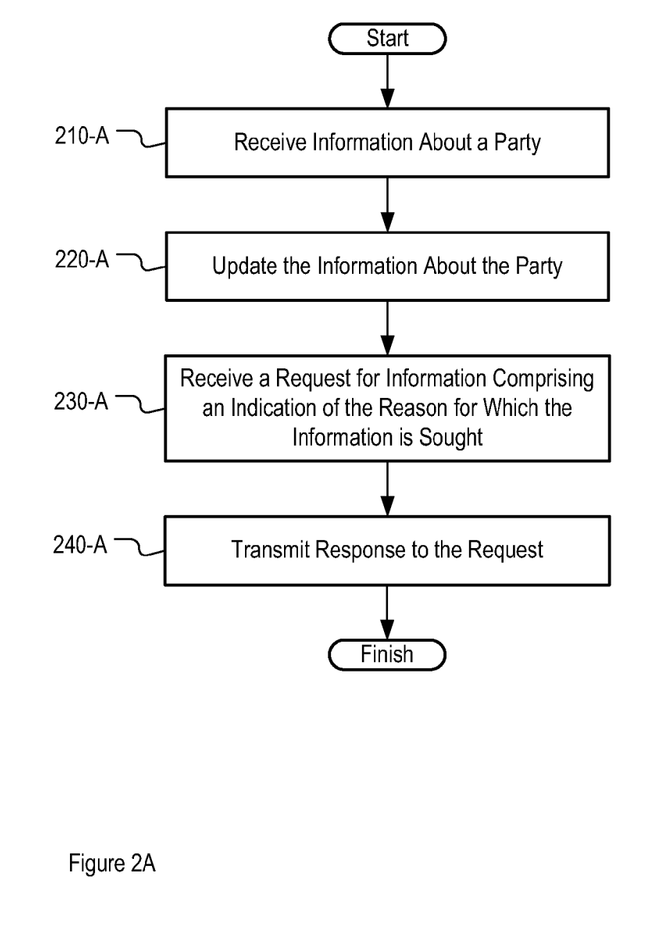
FIG. 2A depicts a flowchart of the execution of the salient tasks of the illustrative embodiment of the present invention performed by consumer portal 130.

FIG. 2A depicts a flowchart of the execution of the salient tasks of the illustrative embodiment of the present invention performed by consumer portal 130. It will be clear to those skilled in the art, after reading this disclosure, how to perform the tasks associated with FIG. 2A in a different order than represented or to perform one or more of the tasks concurrently. Furthermore, it will be clear to those skilled in the art, after reading this disclosure, how to make and use alternative embodiments of the present invention that omit one or more of the tasks.

At task 210-A, consumer portal 130 receives subscription information from user 101. In accordance with the illustrative embodiment, the subscription information comprises the user's identification, contact, and billing information. Furthermore, in accordance with the illustrative embodiment of the present invention, the subscription information comprises one or more rules governing the dissemination of the subscription information to third parties. Task 210-A is described in further detail in the discussion with respect to FIG. 3.

At task 220-A, consumer portal 130 receives an update to the subscription information of user 101. Task 220-A is described further in the discussion with respect to FIG. 5.

At task 230-A, consumer portal 130 receives a request for information about user 101. The request comprises: (1) identification of the information needed; (2) an indication of the reason for which the information is sought; and (3) identification of the requesting party. However, it will be clear to those skilled in the art, after reading this disclosure, how to make and use alternative embodiments of the present invention in which the request for information does not comprise an identification of the requesting party. In accordance with the illustrative embodiment of the present invention, the request is for the contact information of user 101, but it will be clear to those skilled in the art, after reading this disclosure, how to make and use alternative embodiments of the present invention in which the request for information is for any item of information received by consumer portal 130 at tasks 210-A and 220-A. Furthermore, in accordance with the illustrative embodiment of the present invention, the indication of a reason for which the information is sought is an alphanumeric string, but it will be clear to those skilled in the art, after reading this disclosure, how to make and use alternative embodiments of the present invention in which the indication of the reason for which the information is sought is represented in an alternative way, such as, for example, and without limitation, a bit string, number, etc.

Similarly, the identification of the requesting party is an alphanumeric string which identifies the sender of the request for information received at task 230-A. In accordance with the illustrative embodiment of the present invention, the business organization with which terminal 140 is associated is identified as the maker of the request for information. However, it will be clear to those skilled in the art, after reading this disclosure, how to make and use alternative embodiments of the present invention in which the identification of a requesting party, points to a specific person that ordered the request, a specific department within the business organization with which terminal 140 is associated, specific geographic location, physical location, specific telecommunications terminal, and so forth.

In accordance with the illustrative embodiment, the indication of the reason for which the information is sought reveals that the request for information is made in connection with offering user 101 to purchase a new service provided by the by the business organization with which terminal 140 is associated. However, it will be clear to those skilled in the art, after reading this disclosure, how to make and use alternative embodiments of the present invention in which the indication of the reason for which the information is sought identifies one or more of (i) a transaction in relation to which the information is sought; (ii) an indication of a goal which the requester of the information seeks to achieve; or (iii) an indication of a specific matter in connection with which the information request is made. In particular, a transaction in relation to which the information is sought is a transaction, such as, for example, and without limitation, billing user 101 for a service received, renewing a service subscription, enacting a change in a service which user 101 receives, and so forth. Similarly, a goal which the maker of the request for information seeks to achieve, can be, for example, and without limitation, saving the rain forest, helping children learn, electing a particular candidate for office, etc. And the indication of a specific matter in relation with which the information is sought is an indication of any past, future, and present actions or dealings of user 101 in connection with which the request for information is made, such as, for example, and without limitation, identification of an order made by the user (e.g. order number), an ongoing application for admission to college, a request for information filed by the user, a voice mail message left by user 101, a project on which the user has been working, the user's membership in a car enthusiasts club, the user's request for a price quote, etc.

At task 240-A, consumer portal 130 responds to the information request received at task 230-A. The execution of task 240-A is further described in the discussion with respect to FIG. 6.

Figure 2B:
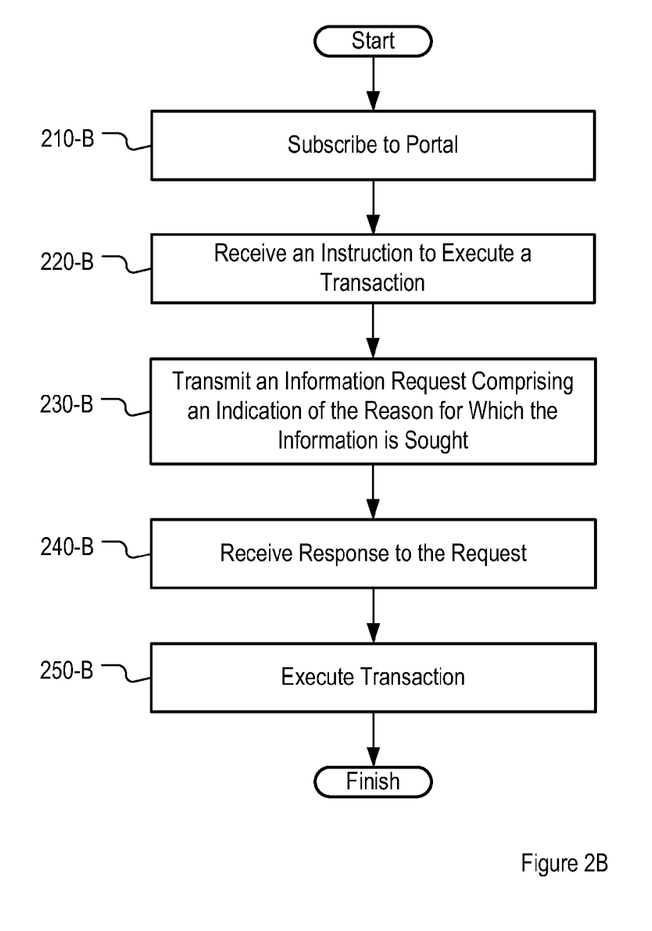
FIG. 2B depicts a flowchart of the execution of the salient tasks of the operation of the illustrative embodiment performed by terminal 140.

FIG. 2B depicts a flowchart of the salient tasks of the operation of the illustrative embodiment performed by terminal 140. It will be clear to those skilled in the art, after reading this disclosure, how to perform the tasks associated with FIG. 2B in a different order than represented or to perform one or more of the tasks concurrently. Furthermore, it will be clear to those skilled in the art, after reading this disclosure, how to make and use alternative embodiments of the present invention that omit one or more of the tasks.

At task 210-B, consumer portal 130 receives subscription information from terminal 140. In accordance with the illustrative embodiment of the present invention, the subscription information comprises an identification of the business organization with which terminal 140 is associated. However, it will be clear to those skilled in the art, after reading this disclosure, how to make and use alternative embodiments of the present invention in which the subscription information comprises any information concerning the business organization, such as, for example, and without limitation, authentication information, address, nature of the business in which the organization is involved, etc.

At task 220-B, terminal 140 is instructed to execute a transaction. In accordance with the illustrative embodiment, the transaction is to initiate a telecommunications session with user 101 and offer the user to purchase a new service provided by the business organization with which the terminal 140 is associated. It will be clear to those skilled in the art, after reading this disclosure, how to make and use alternative embodiments of the present invention in which the transaction is any transaction possible between the submitter of the request for information and user 101, such as, for example, and without limitation, billing the user, enacting changes to the user's service, requesting information from the user, requesting authorization from the user, and so forth.

At task 230-B terminal 140 transmits to consumer portal 130 a request for the contact information of user 101. The content of the request for information is described in the discussion with respect to task 230-A.

At task 240-B, consumer portal 140 receives a response to the request for information submitted at task 230-B. In accordance with the illustrative embodiment of the present invention the response comprises the email address of user 101.

At task 250-B, consumer portal 130, in a well-known fashion, sends user 101 an email with an offer for the new service provided by the by the business organization with which terminal 140 is associated.

Figure 3:
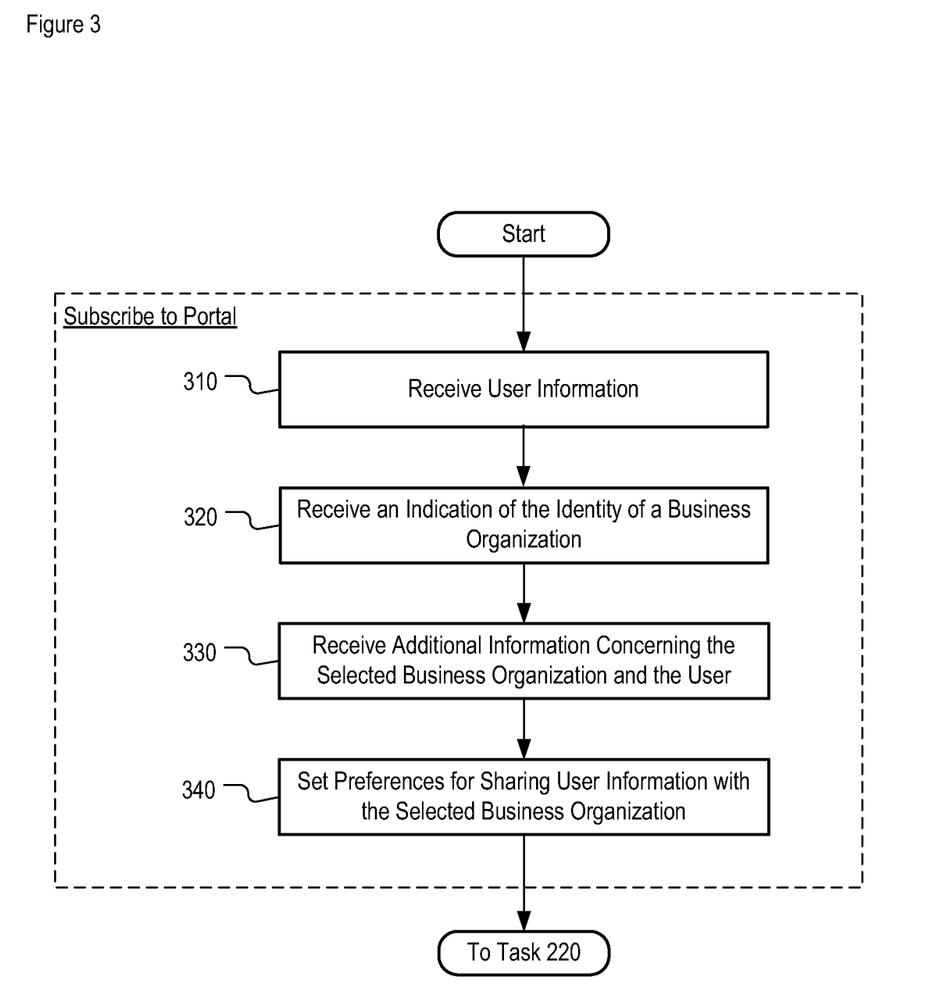
FIG. 3 depicts a flowchart of the execution of the salient subtasks associated with the performance of task 210-A.

FIG. 3 depicts a flowchart of the execution of the salient subtasks associated with the performance of task 210-A. It will be clear to those skilled in the art, after reading this disclosure, how to perform the tasks associated with FIG. 3 in a different order than represented or to perform one or more of the tasks concurrently. Furthermore, it will be clear to those skilled in the art, after reading this disclosure, how to make and use alternative embodiments of the present invention that omit one or more of the tasks.

At task 310, user 101 registers with consumer portal 130 and submits his personal information to the portal. Upon receipt of the information, consumer portal 130 creates and stores an information record for user 101. In accordance with the illustrative embodiment, the information record is a database record, but it will be clear to those skilled in the art, after reading this disclosure, how to make and use alternative embodiments of the present invention in which the user information is stored in alternative ways, such as, kept in free standing text files, binary files, etc. Furthermore, in accordance with the illustrative embodiment of the present invention, the personal information of user 101 comprises identification, contact, and payment information. It will be clear to those skilled in the art, after reading this disclosure, that the information received at task 320 is not limited to any specific types of information and that alternative embodiments of the present invention can be devised in which the subscription information comprises any item of information, personal and non-personal, concerning user 101, such as, for example, and without limitation, the user's favorite color, profession, political views, make of the user's car, etc.

In accordance with the illustrative embodiment of the present invention, the identification information for user 101 is the name of the user and the maiden name of the user's mother. It will be clear to those skilled in the art, after reading this disclosure, how to make and use alternative embodiments of the present invention in which the identification information for user 101 comprises any type of information that can be used to distinguish user 101, such as, for example, and without limitation, social security number, employee identification number, nickname, customer account number, etc. The contact information for user 101 comprises the user's email address, work telephone number, and cellular telephone number. Those skilled in the art will recognize, after reading this disclosure, how to make and use alternative embodiments of the present invention in which the contact information for user 101 comprises any information which can be used to contact user 101, such as, for example, and without limitation, one or more mailing addresses associated with the user, emails, telephone numbers, pager numbers, instant messenger handles, etc. The payment information of user 101 comprises a checking account number and credit card number. It will be clear to those skilled in the art, after reading this disclosure, how to make and use alternative embodiments of the present invention in which the payment information comprises any type of financial information concerning user 101, such as, for example, and without limitation, money market accounts, a list of checking and savings accounts, and so forth.

Those skilled in the art will also recognize, after reading this disclosure, how to make and use alternative embodiments of the present invention in which user 101 submits availability information to consumer portal 130. In particular, the availability can indicate the availability of user 101 for communication over a particular medium (e.g. online chat, telephone, Short Message Service (SMS), etc.), the availability of user 101 to communicate at particular times or dates, etc.

At task 320, user 101 selects an entity with which he or she wants to share the personal information submitted at task 310 and submits an indication of the selection to consumer portal 130. In accordance with the illustrative embodiment, the entity permitted access to the information of user 101 is the business organization with which terminal 140 is associated, but it will be clear to those skilled in the art, after reading this disclosure, how to make and use alternative embodiments of the present invention in which any possible entity is selected, such as, for example, and without limitation, other business organizations, individual persons, social networks, nonprofit organizations, etc.

At task 330, consumer portal 130 receives an indication of the relationship between user 101 and the entity selected at task 320. In accordance with the illustrative embodiment of the present invention, the indication of relationship is submitted by user 101, but it will be clear to those skilled in the art, after reading this disclosure, how to make and use alternative embodiments of the present invention in which consumer portal 130 retrieves the indication of the relationship between the user and the business organization from a third-party server. Moreover, in accordance with the illustrative embodiment of the present invention, consumer portal 130 receives an indication that user 101 is a subscriber of the business organization selected at task 320. However, it will be clear to those skilled in the art, after reading this disclosure, how to make and use alternative embodiments of the present invention in which any type of relationship between user 101 and the entity identified at task 320 is specified, such as, for example, and without limitation, a familial relationship, an employment relationship, contractual relationship, financial relationship (i.e. user is investor in a business), ownership relationship, business relationship, membership association (i.e. user is a member of a social network), and others. Furthermore, it will be clear to those skilled in the art, after reading this disclosure, how to make and use alternative embodiments of the present invention, in which additional information concerning the relationship between user 101 and the business organization with which terminal 140 is associated, such as, for example, and without limitation, account which user 101 has with the organization, length of the relationship between the user and the organization, type of account which user 101 has with the business organization, whether the user is a preferred customer of the business organization, etc.

At task 340, user 101 submits to consumer portal 130 an indication of one or more rules for sharing the information of user 101 with the business organization with which terminal 140 is associated. In accordance with the illustrative embodiment of the present invention, the rules for sharing the information of user 101 depend on the identity of the party requesting the information, but it will be clear to those skilled in the art, after reading this disclosure, how to make and use alternative embodiments of the present invention in which the rules for sharing the user information are neutral with respect to the identity of the requesting party. Task 340 is described in further detail in the discussion with respect to FIG. 4.

Figure 4:
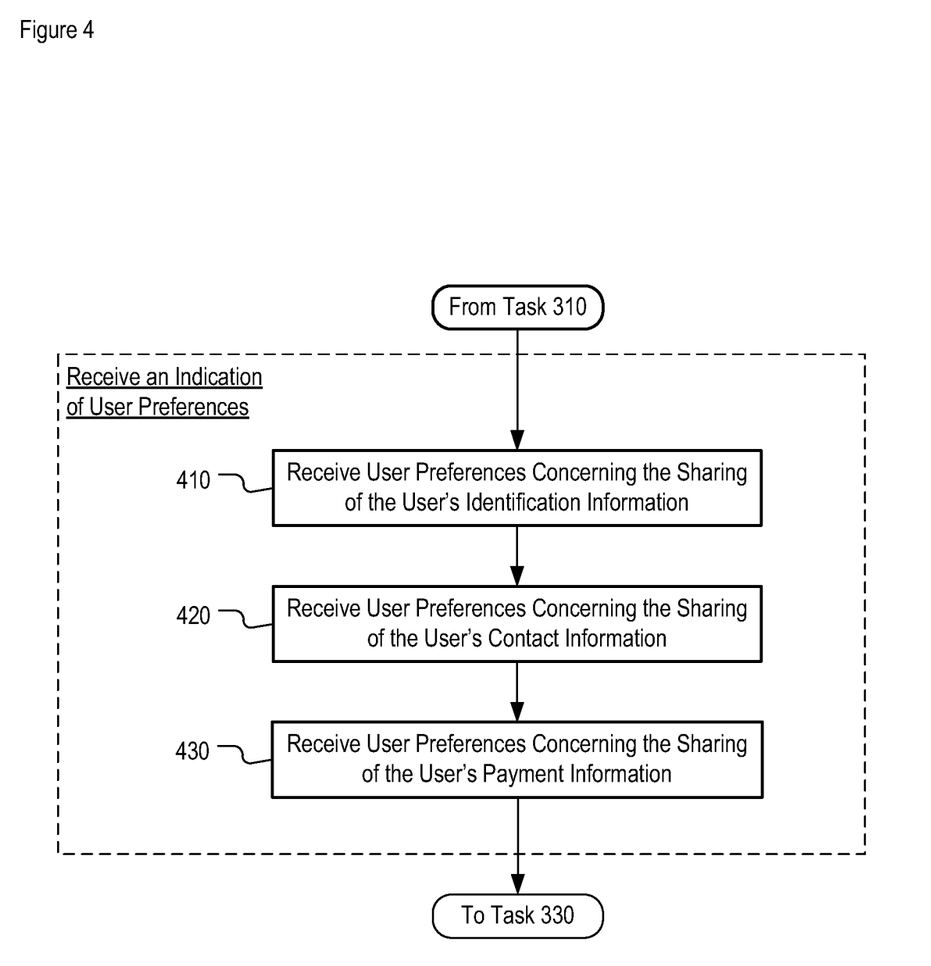
FIG. 4 depicts a flowchart of the execution of the salient sub-tasks associated with the performance of task 340.

FIG. 4 depicts a flowchart of the salient sub-tasks associated with the execution of task 340. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

Figure 5:
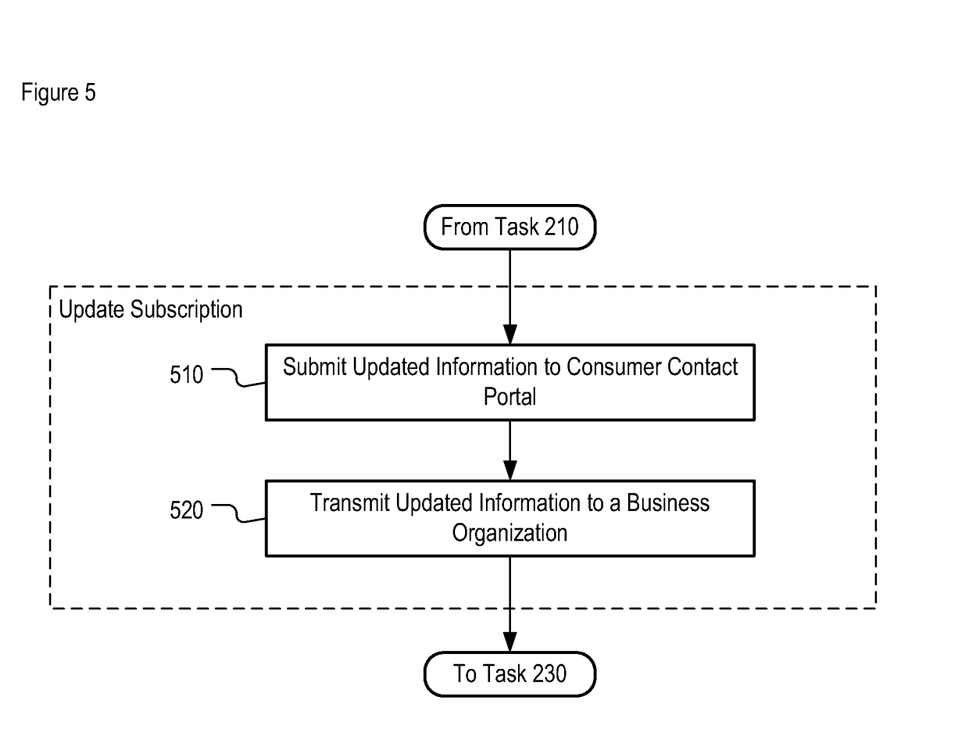
FIG. 5 depicts a flowchart of the execution of the salient subtasks associated with the performance of task 220-A.

At task 410, user 101 submits to consumer portal 130 an indication of a rule for the sharing of the identification information of user 101. More specifically, the rule provides that consumer portal 130 is permitted to share the maiden name of the user's mother only in response to requests for information associated with a financial transaction. For example, if the reason for a request for the maiden name of the user's mother is completing a credit application on behalf of the user, or to execute a withdrawal of funds from an account of the user, consumer portal 130 will provide the maiden name. In any event, it will be clear to those skilled in the art, after reading this disclosure, how to make and use alternative embodiments of the present invention in which the rule for sharing the identification information of user 101 is based on any possible reason for which the identification information can be sought. For example, and without limitation, such rules are:
  i. share the user's Social Security number in response to requests for information associated with the provision of daycare services;
  ii. share the user's employee number only when the request for information is associated with a project XYZ (on which user 101 has been working);
  iii. do not share the number of the drivers license of user 101 in response to requests for information associated with solicitations from vehicle insurers;
  iv. share the user's Social Security number only if the user has a checking account with the submitter of the request for information;

At task 420, user 101 submits to consumer portal 130 an indication of a rule for the sharing of the contact information of user 101. More specifically, the rule provides that consumer portal 130 is permitted to share the telephone number of user 101 only in response to requests for information which are not associated with telemarketing. For example, under this arrangement, if anyone requests the telephone number of user 101 in connection with soliciting business from the user, the request will be denied. In any event, it will be clear to those skilled in the art, after reading this disclosure, how to make and use alternative embodiments of the present invention in which the rule for sharing the contact information of user 101 is based on any possible reason for which the contact information can be sought. For example, and without limitation, such rules are:
  i. share the user's address in response to requests for information associated with the user's mortgage;
  ii. share the user's telephone number in response to requests associated with the confirmation of appointments;
  iii. share the user's work telephone number only in response to requests associated with college applications by the user;

At task 430, user 101 submits to consumer portal 130 an indication of a rule for the sharing of the payment information of user 101. More specifically, the rule provides that consumer portal 130 is permitted to share the checking account number of user 101 only in response to requests of information associated with the repayment of loans by the user. For example, under this arrangement, if the business organization selected task 320 submits a request for the user's checking account number and the indication of the reason for which the information is sought reveals that the request is made in connection with billing the user for services received, the request will be denied. However, the same request will be fulfilled, if the indication of a reason for which the information is sought reveals that the request of information is made in connection with the repayment of a loan received by the user. In any event, it will be clear to those skilled in the art, after reading this disclosure, how to make and use alternative embodiments of the present invention in which the rule for sharing the contact information of user 101 is based on any possible reason for which the payment information can be sought. For example, and without limitation, such rules are:
  i. share the user's credit card number only in response to requests for information made in connection with a payment for services already received;
  ii. never share the user's credit card number in response to requests for information made in connection with telemarketing;
  iii. share the user's checking account number in response to requests for information made in connection with billing the user for services received only when the sum to be billed exceeds $50 dollars;

Although, the rules submitted by user 101 at tasks 410 through 430 are based on a reason for which information is sought, it will be clear to those skilled in the art, after reading this disclosure, how to make and use alternative embodiments of the present invention in which user 101 specifies rules that are based on the relationship between user 101 and the entity identified at task 320. For example, and without limitation, such rules are:
  i. share the user's credit card number only if he is a preferred customer of the maker of the request for information;
  ii. share the user's date of birth only with close relatives, such as brothers, but not with distant relatives;
  iii. share the user's checking account number with the user's brother, but not with the user's neighbor;

It will also be clear to those skilled in the art, after reading this disclosure, how to make and use alternative embodiments of the present invention in which user 101 specifies rules that are based on availability information for user 101. For example, and without limitation, such rules are:

i. do not share the user's phone number between 9 a.m. and 5 p.m.;
ii. share the user's instant messenger handle only if the user is connected to the Internet;
iii. do not share the user's telephone and instead share the user's instant messenger handle if the user is connected to the Internet;

FIG. 5 depicts a flowchart of the execution of the salient subtasks associated with the performance of task 220-A. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 510, user 101 submits to consumer portal 130 an update to the user's information. Consumer portal 130 receives the information and updates the information record in which the information for user 101 is stored. In accordance with the illustrative embodiment, user 101 submits a new work telephone number, but it will be clear to those skilled in the art, after reading this disclosure, how to make and use alternative embodiments of the present invention in which any item of information received at task 310 is updated.

At task 520, in a well-known fashion, consumer portal 130 notifies the business organization associated with terminal 140 of the updated work telephone number. In accordance with the illustrative embodiment, the notification comprises sending a message to terminal 140 urging it to request the updated telephone number. However, it will be clear to those skilled in the art, after reading this disclosure, how to make and use alternative embodiments of the present invention in which the updated address of user 101 is transmitted directly. Furthermore, it will be clear to those skilled in the art, after reading this disclosure, how to make and use alternative embodiments of the present invention in which the disclosure of the updated information by consumer portal 130 is subject to the rules for the sharing of information described in the discussion with respect to FIG. 4.

Figure 6:
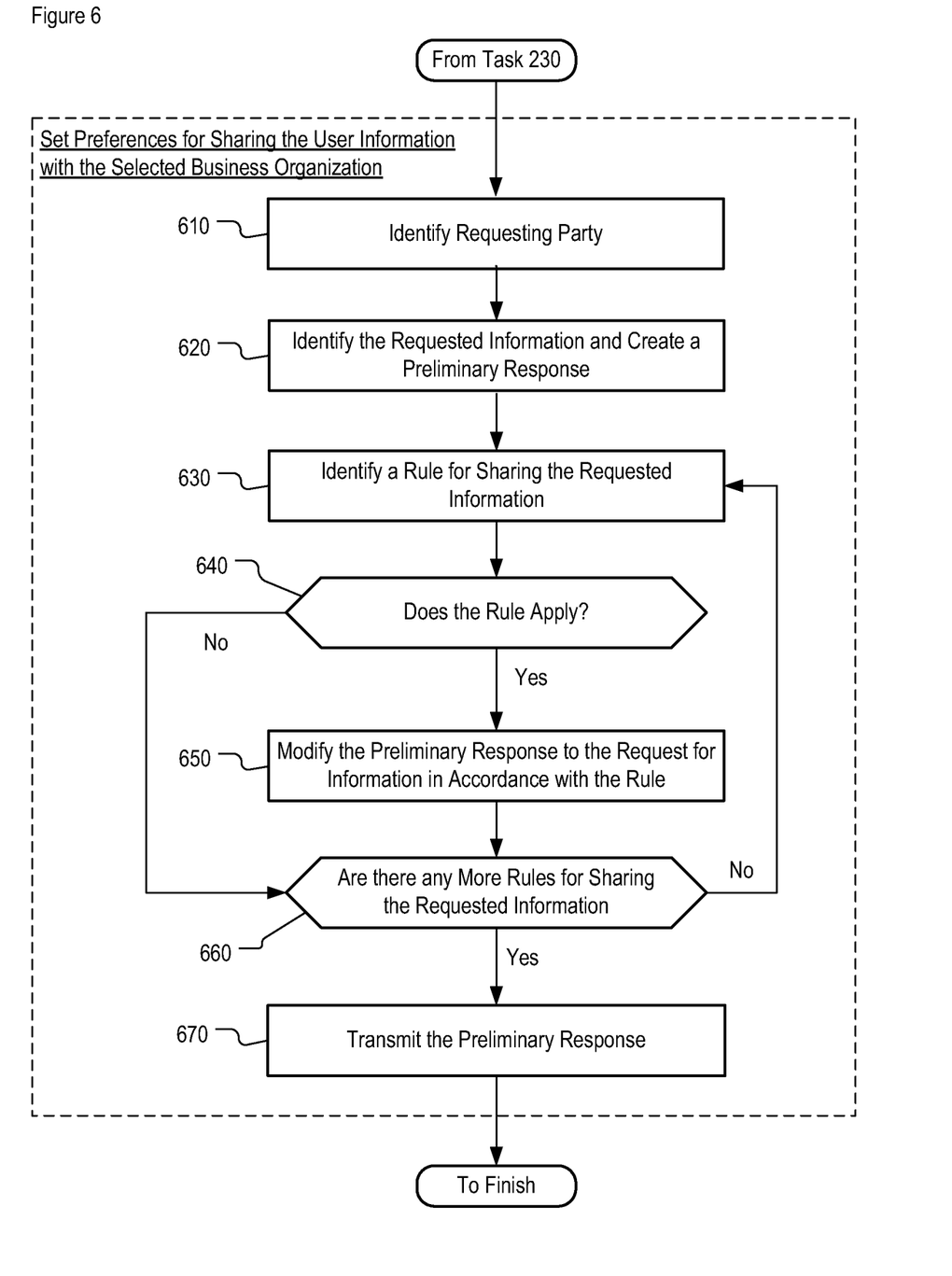
FIG. 6 depicts a flowchart of the execution of the salient sub-tasks associated with the performance of task 240-A.

FIG. 6 depicts a flowchart of the salient sub-tasks associated with the execution of task 240-A. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, consumer portal 130 identifies the submitter of the request for information received at task 230-A. As stated above, the submitter of the request is the business organization associated with terminal 140. In accordance with the illustrative embodiment of the present invention, identification of the submitter is contained in the request for information. However, it will be clear to those skilled in the art, after reading this disclosure, how to make and use alternative embodiments of the present invention in which the submitter of the request is identified through alternative means, such as, for example, and without limitation, searching the Internet Protocol (IP) address of terminal 140 in a database and matching it to an identifier of the owner of the Internet Protocol (IP) address (i.e. the business organization associated with terminal 140).

At task 620, consumer portal 130 identifies the information requested by the business organization and creates a preliminary response to the request which includes all of the requested information. Because the request is for the contact information of user 101, consumer portal 130 prepares a preliminary response that includes both the telephone number and email of user 101.

At task 630, consumer portal 130 determines whether user 101 has specified any rules for the sharing of his telephone number and email. In accordance with the illustrative embodiment, consumer portal 130 determines that user 101 has specified a rule for the sharing of his or her telephone number which, as stated in the discussion with respect to task 420, prohibits consumer portal 130 from sharing the telephone number in response to requests associated with telemarketing.

At task 640, consumer portal 130 determines whether the identified rule applies. In particular, consumer portal 130 determines whether the indication of a reason for which the information is sought received at task 230-A can be interpreted as an indication that the information is sought in connection with telemarketing. As previously discussed, in the illustrative embodiment, the indication of a reason for which the information is sought is an alphanumeric string. In accordance with the illustrative embodiment, consumer portal 130 compares the string, which constitutes the indication of a reason for which the information is sought, to a list of indications of reasons for which information is sought that are known to indicate the seeking of information in connection with a telemarketing event. However, it will be clear to those skilled in the art, after reading this disclosure, how to make and use alternative embodiments of the present invention in which consumer portal 130 determines that the requested for information is made in connection with a telemarketing even by alternative means, such as, for example, and without limitation, latent semantic indexing (LSI). Upon a positive determination that the rule identified at task 630 applies, consumer portal 130 proceeds to execute task 650. Otherwise, consumer portal 130 proceeds to execute task 660.

At task 650, consumer portal 130 removes from the preliminary response information that the portal is prohibited from providing to the submitter of the request for information under the rule analyzed at task 640. In accordance with the illustrative embodiment, consumer portal 130 removes the telephone number of user 101 from the preliminary response prepared at task 620.

At task 660, consumer portal 130 determines the existence of additional rules for the sharing of the requested information. Upon a positive determination, consumer portal 130 proceeds to execute task 630. Otherwise, the portal executes task 670.

At task 670, consumer portal 130, in a well-known fashion, transmits the preliminary response to terminal 140.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, via a processor, from a first party, information about the first party and rules established by the first party, wherein the rules identify requirements for accessing the information;
receiving, via the processor, from a second party, a request to receive a portion of the information, and an indication of an intended use of the portion of the information after the portion of the information is received by the second party; and when the request meets a requirement of the requirements associated with the portion of the information, transmitting, via the processor, the portion of the information to the second party, wherein the portion of the information is chosen based on an identity of the second party and the indication.

2. The method of claim 1, wherein the request is transmitted from a first node that is inside an enterprise network, and wherein the request is received at a second node that is outside of the enterprise network.

3. The method of claim 1, wherein the portion of the information is chosen further based on an availability indication for the first party.

4. The method of claim 1, wherein the portion of the information is chosen further based on an indication of a preferred mode of communication.

5. The method of claim 1, wherein the portion of the information is chosen further based on an account of the first party with the second party.

6. The method of claim 1, wherein the portion of the information is chosen further based on a subscription of the first party to an event.

7. The method of claim 1, further comprising initiating a telecommunications session to the first party from the second party.

8. The method of claim 1, further comprising initiating an electronic funds transaction with the first party.

9. The method of claim 1, wherein the portion of the information comprises billing information for the first party.

10. The method of claim 1, wherein the portion of the information comprises availability information for the first party with respect to a subscription account of the first party with the second party.

11. A system comprising:
 a processor; and
 a computer-readable storage medium having instructions stored which, when executed by the processor, cause the processor to perform operations comprising:
  receiving, from a first party, information about the first party and rules established by the first party, wherein the rules identify requirements for accessing the information;
  receiving, from a second party, a request to receive a portion of the information, and an indication of an intended use of the portion of the information after the portion of the information is received by the second party; and
  when the request meets a requirement of the requirements associated with the portion of the information, transmitting, the portion of the information to the second party, wherein the portion of the information is chosen based on an identity of the second party and the indication.

12. The system of claim 11, wherein the request is transmitted from a first node that is inside an enterprise network, and wherein the request is received at a second node that is outside of the enterprise network.

13. The system of claim 11, wherein the portion of the information is chosen further based on an availability indication for the first party.

14. The system of claim 11, wherein the portion of the information is chosen further based on an indication of a preferred mode of communication.

15. The system of claim 11, wherein the portion of the information is chosen further based on an account of the first party with the second party.

16. The system of claim 11, wherein the portion of the information is chosen further based on a subscription of the first party to an event.

17. The system of claim 11, the computer-readable storage medium having additional instructions stored which result in operations comprising initiating a telecommunications session to the first party from the second party.

18. The system of claim 11, the computer-readable storage medium having additional instructions stored which result in operations comprising initiating an electronic funds transaction with the first party.

19. The system of claim 11, wherein the portion of the information comprises billing information for the first party.

20. The system of claim 11, wherein the portion of the information comprises availability information for the first party with respect to a subscription account of the first party with the second party.

\* \* \* \* \*